(12) United States Patent
Pelt et al.

(10) Patent No.: US 12,541,241 B2
(45) Date of Patent: Feb. 3, 2026

(54) TOGGLE AND POWER REDUCTION FOR CHIPLET LINKS

(71) Applicants: Advanced Micro Devices, Inc, Santa Clara, CA (US); ATI Technologies ULC, Markham (CA)

(72) Inventors: Robert Landon Pelt, Austin, TX (US); Michael James Tresidder, Austin, TX (US); YanFeng Wang, Richmond Hill (CA)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 133 days.

(21) Appl. No.: 18/621,542

(22) Filed: Mar. 29, 2024

(65) Prior Publication Data

US 2025/0306663 A1    Oct. 2, 2025

(51) Int. Cl.
*G06F 1/26* (2006.01)
*G06F 1/32* (2019.01)
*G06F 1/3234* (2019.01)

(52) U.S. Cl.
CPC .................. *G06F 1/3234* (2013.01)

(58) Field of Classification Search
CPC .................................... G06F 1/3234
See application file for complete search history.

(56) References Cited

U.S. PATENT DOCUMENTS

| | | | |
|---|---|---|---|
| 2013/0019064 A1* | 1/2013 | Kumashikar | G06F 12/126 711/130 |
| 2018/0314655 A1* | 11/2018 | Sadowski | G06F 13/4204 |
| 2019/0384367 A1* | 12/2019 | Jain | G06F 1/3296 |
| 2023/0060813 A1* | 3/2023 | Song | G06F 3/0629 |
| 2024/0004821 A1* | 1/2024 | Tresidder | G06F 13/4004 |

* cited by examiner

*Primary Examiner* — Xuxing Chen
(74) *Attorney, Agent, or Firm* — FIG. 1 Patents

(57) ABSTRACT

Toggle and power reduction for chiplet links is described. In accordance with the described techniques, a mask is selected from a plurality of pre-generated masks based on a bit pattern of data to be transmitted from a first chiplet to a second chiplet via a chiplet link. Masked data are generated by applying the mask to the data at the first chiplet. The masked data are transmitted from the first chiplet to the second chiplet via the chiplet link; and the masked data are corrected at the second chiplet by inverting the mask at the second chiplet.

20 Claims, 5 Drawing Sheets

TOGGLE AND POWER REDUCTION FOR CHIPLET LINKS

BACKGROUND

An integrated circuit, or chip, often has a defined functionality that is performed using several independent sets of electronic circuits, referred to herein as chiplets. The chiplets are combined during assembly to form the integrated circuit and are interconnected together via a chiplet link. The chiplet link provides a communication interface that enables communication between the individual chiplets for data exchange and coordination. For example, individual chiplets function as central processing units (CPUs), graphics processing units (GPUs), memory modules, accelerators, and various specialized processors that work together to provide the defined functionality of the integrated circuit. The chiplet link includes a plurality of physical lanes for transporting data, which are sent as a series of binary signals, e.g., a lower voltage state associated with the binary digit "0" or a higher voltage state associated with the binary digit "1." Toggling between the lower voltage state and the higher voltage state consumes power.

DETAILED DESCRIPTION

Overview

Figure 1:
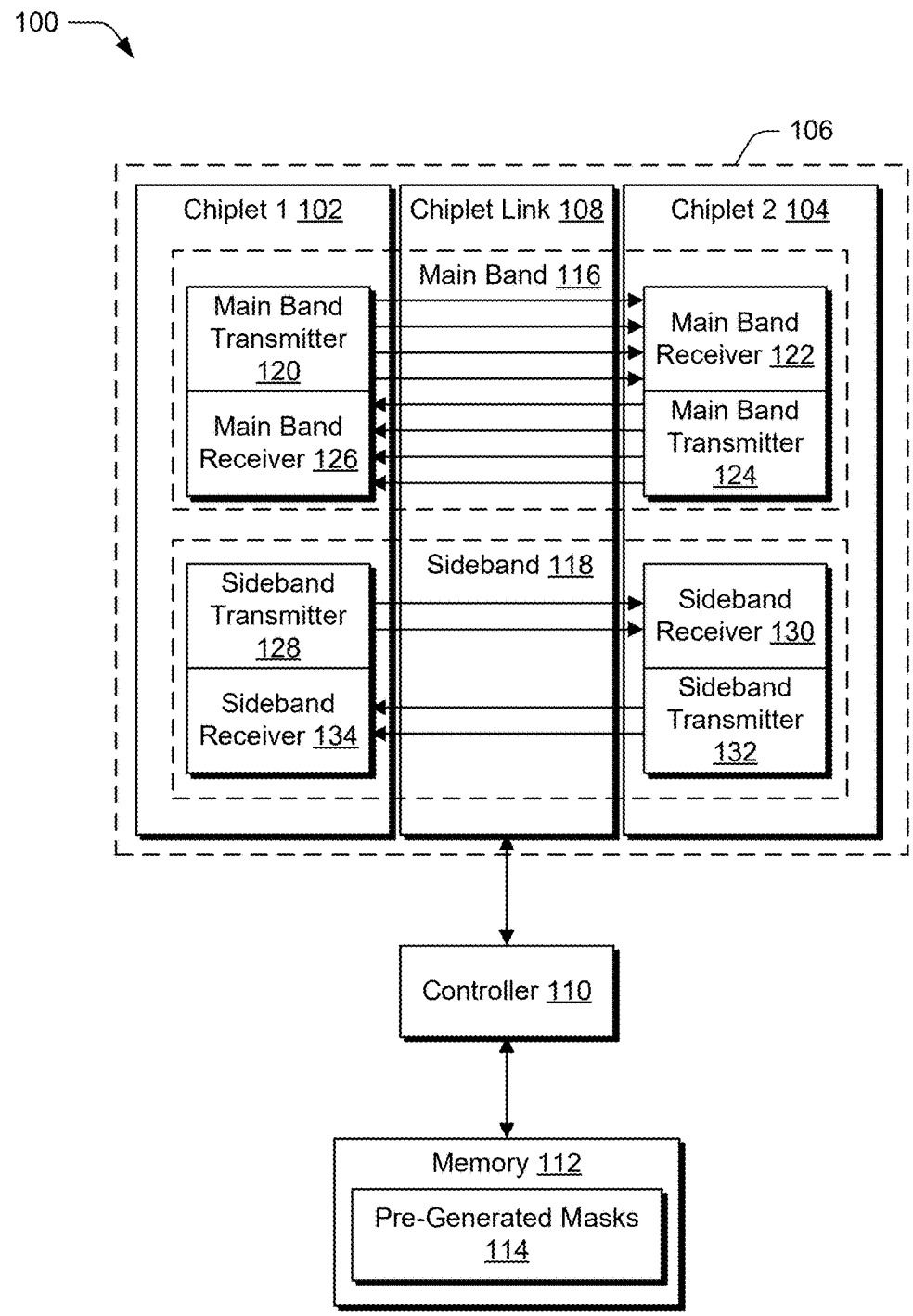
FIG. 1 is a block diagram of a non-limiting example system in which toggle and power reduction for chiplet links is implemented.

In various scenarios, elements of an integrated circuit, such as chiplets, are manufactured independently and assembled, or integrated, after manufacture and connected via a chiplet link. The chiplet link provides a communication interface between the chiplets to facilitate data exchange, thus enabling the chiplets to function as a larger, cohesive computing system. The chiplet link, for instance, provides a physical and logical connection between the chiplets. However, transporting data over the chiplet link consumes power, which generates heat and reduces an energy efficiency and performance of the computing system.

For example, toggling lanes of the chiplet between transmitting a "0" (e.g., a lower voltage signal) and transmitting a "1" (e.g., a higher voltage signal) contributes to the power consumption by the chiplet link. Whether a given lane transmits a "0" or a "1" is dependent on a bit pattern of data to be transported by the chiplet link and how the bit pattern maps to the lanes. In data center environments where large numbers of servers and processors are deployed, power consumption by chiplet links impacts electricity costs and cooling costs. Even in smaller computing systems, decreases in chiplet link power consumption would increase an overall performance and efficiency.

Accordingly, toggle and power reduction for chiplet links is described herein. In one or more implementations, pre-generated masks are used to reduce power consumption by a chiplet link during data transmission. For instance, the pre-generated masks are bit masks that are created and stored during an offline simulation process that models data transport by the chiplet link. The offline simulation process maps specific bit patterns of data to specific mask bit patterns that are expected to reduce power consumption by the chiplet link, e.g., by reducing a toggle rate of the chiplet link. The pre-generated masks are stored for use in a runtime data transmission process. By way of example, the pre-generated masks are stored in a look-up table, and so a given mask is retrievable using an index.

In various implementations, the chiplet link couples a first chiplet and a second chiplet in a computing system. When data is to be transmitted from the first chiplet to the second chiplet during the runtime data transmission process, the first chiplet identifies a mask of the pre-generated masks based on, e.g., a bit pattern of the data to be transmitted. In at least one implementation, the first chiplet uses entropy calculations to select the mask that, if applied to the data, would result in the greatest reduction to the toggle rate of the chiplet link. Additionally or alternatively, the entropy calculation further considers an energy cost of crosstalk between adjacent lanes due to the interaction between the magnetic fields of the adjacent lanes. Once identified, the first chiplet retrieves the mask from storage based on its index.

In various implementations, the first chiplet applies the mask to the data to be transmitted via a bitwise operation, and the chiplet link transports the masked data to the second chiplet. The first chiplet also transmits the index of the mask to the second chiplet via the chiplet link. In at least one implementation, the masked data is sent via a main band of the chiplet link, whereas the index is sent via a sideband of the chiplet link. In at least one variation, however, the index is also sent via the main band of the chiplet link. Whether the index is sent via the main band or the sideband, an overall bandwidth of the communication is reduced by transmitting the index rather than sending the mask itself, metadata instructions, or an inversion signal, thus freeing up bandwidth for more efficient communication of the masked data.

The second chiplet receives the masked data and the index of the mask and uses the index of the mask to correct the masked data, thus restoring the original bit pattern of the data. In at least one implementation, the second chiplet retrieves the mask based on the index and generates an inverted mask, where the inverted mask has opposite bit values to the mask at each bit location. The second chiplet applies the inverted mask to the masked data to restore the original data, for instance.

By reducing the power consumption of the chiplet link by reducing the toggle rate via data masking, an energy efficiency of the computing system is increased. Increasing the energy efficiency extends battery life, decreases energy costs, and increases environmental sustainability, particular for large data centers. Moreover, reducing power consumption by the chiplet link reduces heat production, which reduces an occurrence of heat-related degradation and increases an overall performance of the computing system.

In some aspects, the techniques described herein relate to a system for a computing environment, including a chiplet link communicatively coupling a first chiplet and a second chiplet, and a controller configured to select a mask from a plurality of pre-generated masks based on a bit pattern of data to be transmitted from the first chiplet to the second chiplet via the chiplet link, generate masked data by applying the mask to the data at the first chiplet, transmit the masked data from the first chiplet to the second chiplet via the chiplet link, and correct the masked data at the second chiplet by inverting the mask at the second chiplet.

In some aspects, the techniques described herein relate to a system, wherein selecting the mask from the plurality of pre-generated masks based on the bit pattern of the data to be transmitted from the first chiplet to the second chiplet via the chiplet link includes calculating a power consumption metric based on the bit pattern of the data to be transmitted from the first chiplet to the second chiplet and characteristics of the chiplet link, and selecting the mask from the plurality of pre-generated masks based on an expected reduction to the power consumption metric by the mask compared to other masks of the plurality of pre-generated masks.

In some aspects, the techniques described herein relate to a system, wherein the power consumption metric includes an energy cost of transitioning lanes of the chiplet link between a high voltage state and a low voltage state during transmission of the data.

In some aspects, the techniques described herein relate to a system, wherein the power consumption metric includes an energy cost of crosstalk between adjacent lanes of the chiplet link.

In some aspects, the techniques described herein relate to a system, wherein generating the masked data by applying the mask to the data at the first chiplet includes identifying, by the first chiplet, an index of the mask responsive to selecting the mask from the plurality of pre-generated masks, retrieving, by the first chiplet, the mask from a storage holding the plurality of pre-generated masks based on the index of the mask, and applying, by the first chiplet, the mask to the data via a bitwise operation.

In some aspects, the techniques described herein relate to a system, wherein correcting the masked data at the second chiplet by inverting the mask at the second chiplet includes receiving, by the second chiplet, the index of the mask, retrieving, by the second chiplet, the mask from the storage based on the index of the mask, generating, by the second chiplet, an inverted mask from the mask, and applying, by the second chiplet, the inverted mask to the masked data.

In some aspects, the techniques described herein relate to a system, wherein the second chiplet receives the index of the mask from the first chiplet via a main band of the chiplet link.

In some aspects, the techniques described herein relate to a system, wherein the second chiplet receives the index of the mask from the first chiplet via a sideband of the chiplet link.

In some aspects, the techniques described herein relate to a system, wherein the plurality of pre-generated masks is generated via a power simulation that compares baseline power measurements of unmasked bit patterns to masked power measurements of masked bit patterns.

In some aspects, the techniques described herein relate to a method, including selecting a mask from a plurality of pre-generated masks based on a bit pattern of data to be transmitted from a first endpoint to a second endpoint via an interface, generating masked data by applying the mask to the data at the first endpoint, transmitting the masked data from the first endpoint to the second endpoint via the interface, and correcting the data at the second endpoint by inverting the mask at the second endpoint.

In some aspects, the techniques described herein relate to a method, wherein selecting the mask from the plurality of pre-generated masks based on the bit pattern of the data to be transmitted from the first endpoint to the second endpoint via the interface includes calculating a power consumption metric based on an energy cost of transitioning lanes of the interface between a high voltage state and a low voltage state during transmission of the data, as determined based on a toggle rate of the interface for the transmission of the data, and selecting the mask from the plurality of pre-generated masks based on an expected reduction to the power consumption metric by applying the mask to the data.

In some aspects, the techniques described herein relate to a method, wherein generating the masked data by applying the mask to the data at the first endpoint includes identifying, by the first endpoint, an index of the mask responsive to selecting the mask from the plurality of pre-generated masks, retrieving, by the first endpoint, the mask from a storage holding the plurality of pre-generated masks based on the index of the mask, and applying the retrieved mask to the data using a bitwise operation.

In some aspects, the techniques described herein relate to a method, further including transmitting the index of the mask to the second endpoint via the interface, and wherein correcting the data at the second endpoint by inverting the mask at the second endpoint includes retrieving, by the second endpoint, the mask from the storage based on the index of the mask received from the first endpoint via the interface, generating, by the second endpoint, an inverted mask based on the retrieved mask, and applying, by the second endpoint, the inverted mask to the masked data.

In some aspects, the techniques described herein relate to a method, wherein the plurality of pre-generated masks is generated during an offline operation via a power simulation that compares baseline power measurements of unmasked bit patterns to masked power measurements of masked bit patterns.

In some aspects, the techniques described herein relate to a method, wherein the first endpoint is a first chiplet, the second endpoint is a second chiplet, and the interface is a chiplet link.

In some aspects, the techniques described herein relate to a system, including a first endpoint, a second endpoint, an interface communicatively coupling the first endpoint and the second endpoint, and a controller configured to extract, by the first endpoint, a metric for a data transmission from the first endpoint to the second endpoint via the interface based on a bit pattern of data to be transported and characteristics of the interface, select, by the first endpoint, at least one mask from a plurality of pre-generated masks based on the extracted metric, generate, by the first endpoint, masked data by applying the at least one mask to the data at the first endpoint, transmit, by the interface, the masked data and an index of the at least one mask from the first endpoint to the second endpoint, and invert, by the second endpoint, the at least one mask.

In some aspects, the techniques described herein relate to a system, wherein the metric includes at least one of a toggle rate of lanes the interface for the data transmission or an energy cost of the data transmission.

In some aspects, the techniques described herein relate to a system, wherein selecting, by the first endpoint, the at least one mask from the plurality of pre-generated masks based on the extracted metric includes identifying which of the plurality of pre-generated masks is expected to reduce the extracted metric by a largest amount via an entropy calculation.

In some aspects, the techniques described herein relate to a system, wherein transmitting, by the interface, the masked data and the index of the at least one mask from the first endpoint to the second endpoint includes transmitting the masked data via a main band of the interface, and transmitting the index of the at least one mask via the main band of the interface or a sideband of the interface.

In some aspects, the techniques described herein relate to a system, wherein the first endpoint is a first chiplet, the second endpoint is a second chiplet, and the interface is a chiplet link.

FIG. 1 is a block diagram of a non-limiting example system 100 in which toggle and power reduction for chiplet links is implemented. In particular, the system 100 is a computing environment that includes a first chiplet 102 (e.g., "chiplet 1") and a second chiplet 104 (e.g., "chiplet 2") arranged in a chiplet array 106. Although two chiplets are shown in the chiplet array 106, it is to be appreciated that in variations, the chiplet array 106 includes more than two chiplets, such as a number in a range from three to twelve. In still other variations, the chiplet array 106 includes more than twelve individual chiplets. Regardless of the number, the chiplets of the chiplet array 106 are interconnected via at least one chiplet link. In the non-limiting example system 100 shown in FIG. 1, the first chiplet 102 and the second chiplet 104 are interconnected via a chiplet link 108, which is a physical communication interface between the first chiplet 102 and the second chiplet 104. As such, the first chiplet 102 is a first endpoint of the chiplet link 108, and the second chiplet 104 is a second endpoint of the chiplet link 108.

In one or more implementations, the first chiplet 102 and the second chiplet 104 are discrete semiconductor components or chips that are designed to work in conjunction with each other within the chiplet array 106. For instance, the first chiplet 102 and the second chiplet 104 are modular building blocks that are combined in the chiplet array 106 to form at least a portion of an integrated circuit. In one or more implementations, the first chiplet 102 and the second chiplet 104 are different types of chiplets, such that the chiplet array 106 performs one or more computer processing functionalities. The first chiplet 102 and the second chiplet 104, along with any other chiplets in the chiplet array 106, operate concurrently to perform the one or more computer processing functionalities by communicating via the chiplet link 108. Example computing processes performed by the first chiplet 102 and/or the second chiplet 104 include, but are not limited to, central processing unit processes, graphics processing unit processes, input/output interface processes, analog processes, compute processes, processes for storing data at least temporarily, and so forth.

The first chiplet 102 and the second chiplet 104 include any numerical quantity of electrical circuits. In some variations, the first chiplet 102 and/or the second chiplet 104 are manufactured from a silicon material in addition to, or as an alternative to, any other type of material. For example, the first chiplet 102 and/or the second chiplet 104 include multiple layers, each layer having a defined set of material properties. The layers include insulating layers, dielectric layers, and/or conductive layers, such as metal layers.

In at least one implementation, the non-limiting example system 100 is included in a device that is configurable in a variety of ways. Example configurations of the device include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device is configured as any one or more of those devices listed just above and/or a variety of other devices without departing from the spirit or scope of the described techniques.

In one or more implementations, the chiplet link 108 communicatively couples the chiplet array 106 to a controller 110 and a memory 112. The controller 110 is representative of functionality of the non-limiting example system 100 to perform operations for managing the communication of data across the chiplet link 108, e.g., between the first chiplet 102 and the second chiplet 104. The controller 110, for instance, is implemented as hardware, software, firmware, or a combination thereof. By way of example, the controller 110 includes hardware components for managing the communication of the data across the chiplet link by executing instructions stored in a non-transitory memory of the controller 110 and/or communicated to the controller 110 from another memory location, such as the memory 112. The controller 110, for instance, includes a processor, input/output ports, and an electronic storage medium for executable programs and calibration values. Alternatively or in addition, the controller 110 is or includes circuitry applied to or otherwise fabricated on (e.g., printed, etched, and/or deposited on) one or more hardware components of the system, such as the memory 112. The circuitry is arranged and also applied using logic that enables the controller 110 to carry out the functionalities described above and below.

In one or more implementations, the controller 110 identifies one or more masks from a plurality of pre-generated masks 114 stored in the memory 112 that is to be applied to data transferred across the chiplet link 108 in order to reduce a toggle rate and power consumption of the chiplet link 108. Although the controller 110 is shown separate from the first chiplet 102 and the second chiplet 104, in variations, the controller 110 is included in the first chiplet 102 or the second chiplet 104. For instance, the first chiplet 102 includes a first controller 110, and the second chiplet 104 includes a second controller 110.

The memory 112 is a device or system that is used to store information, such as the pre-generated masks 114. In one or more implementations, the memory 112 corresponds to semiconductor memory where data is stored within memory cells on one or more integrated circuits. In at least one example, the memory 112 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 112 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 112 is configurable in a variety of ways without departing from the spirit or scope of the described techniques.

The chiplet link 108 includes a physical infrastructure that enables the first chiplet 102 and the second chiplet 104 to communicate with each other and exchange data. By way of example, the chiplet link 108 serves as a conduit for data transmission between the first chiplet 102 and the second chiplet 104 via a plurality of individual channels or pathways (e.g., physical links, such as electrical traces or optical interconnects, and/or wireless channels). In one or more implementations, the chiplet link 108 enables communication between the first chiplet 102 and the second chiplet 104 via a main band 116 and a sideband 118. For example, the main band 116 includes a plurality of parallel lanes that carry data exchanged between the first chiplet 102 and the second chiplet 104, such as instructions and/or data packets, whereas the sideband 118 includes a plurality of separate parallel lanes that are used for signaling, control information, error checking, clock synchronization, and/or other auxiliary functions and supplemental information. As an example, a main band transmitter 120 of the first chiplet 102 sends data to a main band receiver 122 of the second chiplet 104 via the main band 116 of the chiplet link 108, and a main band transmitter 124 of the second chiplet 104 sends data to a main band receiver 126 of the first chiplet 102 via the main band 116 of the chiplet link 108. Similarly, a sideband transmitter 128 of the first chiplet 102 sends supplemental information to a sideband receiver 130 of the second chiplet 104 via the sideband 118 of the chiplet link 108, and a sideband transmitter 132 of the second chiplet 104 sends supplemental information to a sideband receiver 134 of the first chiplet 102 via the sideband 118 of the chiplet link 108.

In one or more implementations, data is communicated across the chiplet link 108 in flits, which include at least a portion of a data packet. The chiplet link 108 transports multiple bytes in parallel via the plurality of lanes of the main band 116. As an illustrative example, a 256-byte flit can be transmitted across 64 lanes. The chiplet link 108 consumes power when transporting data, with an amount of power consumed based in part on a toggle rate at which a signal changes state. When the signal changes state, it transitions from the logical or voltage level it was in previously to the opposite level. For example, if the signal was at "0" (low voltage) and it changes state, it goes to "1" (high voltage). Conversely, if the signal was at "1" and it changes state, it goes to "0." Power consumption by the chiplet link 108 is proportional to the toggle rate. That is, frequent switches between the high voltage state and the low voltage state increases power consumption. As such, reducing the toggle rate decreases the power consumed by the chiplet link 108.

In accordance with the techniques described herein, the toggle rate of the chiplet link 108, and thus the power consumption by the chiplet link 108, is reduced by applying a mask to the data prior to transport across the chiplet link 108, such as will be described in more detail with respect to FIGS. 2 and 3. The mask, for instance, selectively changes a "1" to a "0" when the signal was previously at "0" or selectively changes a "0" to a "1" when the signal was previously at "1" in order to avoid toggling the signal of a given lane. As will be elaborated herein, the mask is selected from the pre-generated masks 114 based on a number of physical lanes of the chiplet link 108, a type of lane transport, an energy cost of transitioning between the high and low states, and an energy cost of crosstalk between adjacent lanes. For instance, when multiple lanes are closely spaced or routed in proximity to each other, electromagnetic fields associated with one lane can interact with adjacent lanes. This interaction creates to interference, which manifests as a change in the voltage or current on one lane due to the influence of signals on neighboring lanes. Therefore, in some scenarios, it is more energetically favorable to transition a lane to be at the same voltage state as the adjacent lanes even though the transition itself has an energy cost.

Figure 2:
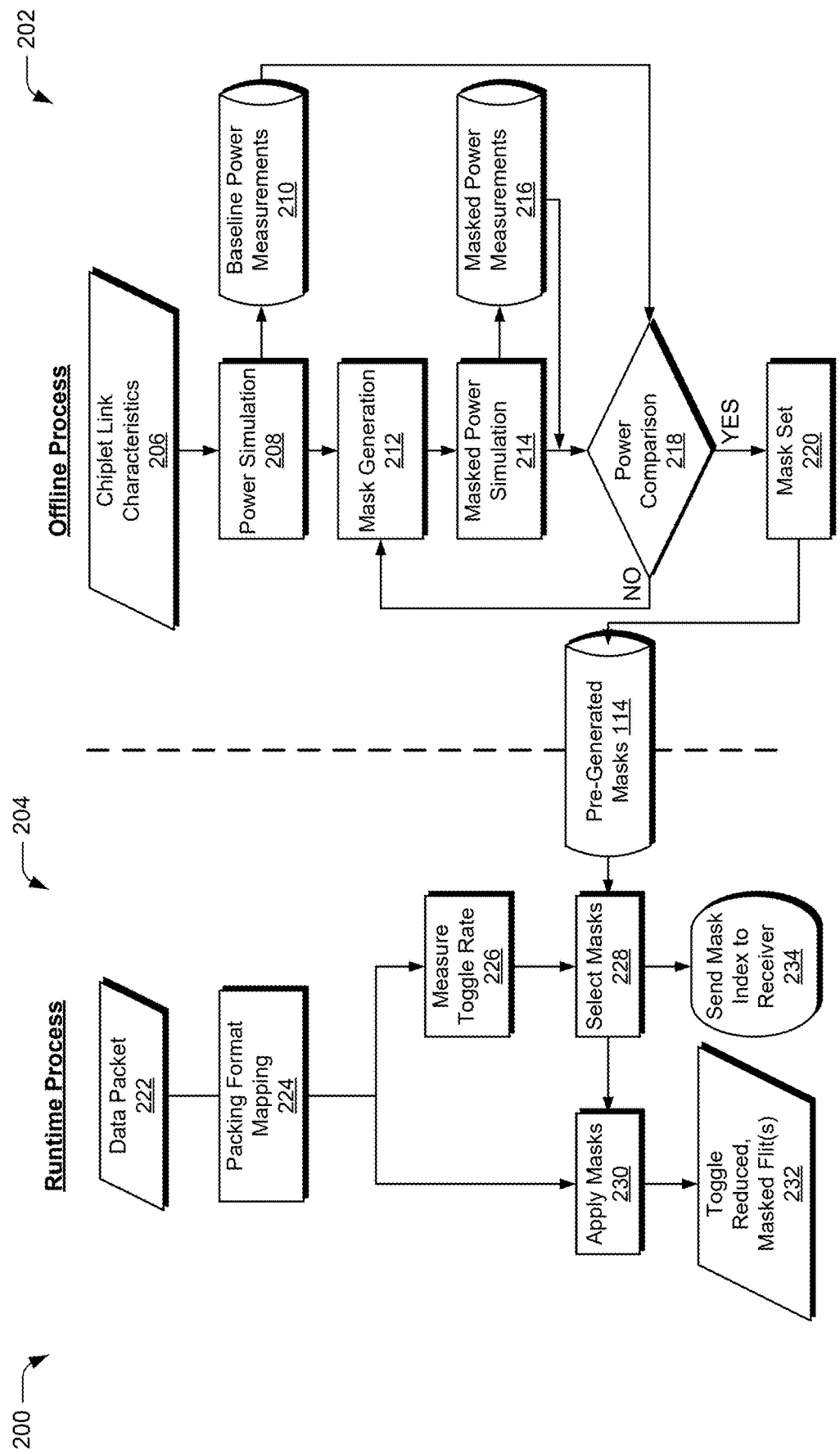
FIG. 2 depicts a non-limiting example process of generating and using masks to reduce toggle rates and power consumption by a chiplet link.

As will be elaborated herein, e.g., with respect to FIG. 2, the pre-generated masks 114 are generated via an offline process (e.g., a power simulation process) and stored as an index in the memory 112. Then, during operation of the non-limiting example system 100, entropy calculations are used to identify one or more masks of the pre-generated masks 114 to apply to the data prior to transport across the chiplet link 108. The selected mask (or masks) is applied to the flit prior to data transport across the chiplet link 108, and the masked flit is transported across the chiplet link 108 along with an index of the mask. In at least one implementation, the masked flit is transported via the main band 116, whereas the index of the mask is communicated via the sideband 118. In at least one variation, both of the masked flit and the mask index are communicated via the main band 116. Transporting a mask index rather than metadata including an indication of which bits have been masked (e.g., such as via the mask data itself or via an inversion signal) advantageously reduces a bandwidth of the data transfer.

As an illustrative example where the first chiplet 102 is sending data to the second chiplet 104, the first chiplet 102 applies the selected mask to the flit, and the main band transmitter 120 of the first chiplet 102 transmits the masked flit to the main band receiver 122 of the second chiplet 104 via the main band 116 of the chiplet link 108. The sideband transmitter 128 of the first chiplet 102 transmits the mask index to the sideband receiver 130 of the second chiplet 104 via the sideband 118 of the chiplet link 108. Alternatively, the main band transmitter 120 transmits the mask index to the main band receiver 122 via the main band 116. The second chiplet 104 uses the received mask index to correct the masked flit and generate the original flit (e.g., the data prior to masking) by looking up the selected mask in the memory 112 based on the mask index and reversing the masking. For instance, if the second chiplet 104 identifies, based on the mask, that a first bit was changed from a "0" to a "1," then the second chiplet 104 changes the first bit back to a "0." As another example, if the second chiplet 104 identifies, based on the mask, that a second bit was unchanged by the mask, then the second chiplet 104 does not alter the second bit. As yet another example, if the second chiplet 104 identifies, based on the mask, that a third bit was changed from a "1" to a "0," then the second chiplet 104 changes the third bit back to a "1." In at least one implementation, the second chiplet 104 reverses the masking by generating and applying an inverted mask to the masked flit, such as will be elaborated with respect to FIG. 3. In this way, communication of the selected mask index enables the receiver to efficiently correct the transported data. Moreover, by applying the selected mask prior to data transport, the toggle rate and energy consumption of the chiplet link 108 are reduced while bandwidth of the chiplet link 108 is also reduced.

FIG. 2 depicts a non-limiting example process 200 of generating and using masks to reduce toggle rates and power consumption by a chiplet link. The illustrated example process 200 includes an offline process 202 that generates the pre-generated masks 114 introduced in FIG. 1 and a runtime process 204 that utilizes the pre-generated masks 114. Where appropriate, reference will be made to corresponding components illustrated in FIG. 1.

Referring first to the offline process 202, chiplet link characteristics 206 are identified, e.g., based on a type of chiplet link 108 included in the non-limiting example system 100. The chiplet link characteristics 206 include, by way of example, a number of physical lanes, such as four, eight, sixteen, thirty-two, or more parallel lanes. The chiplet link characteristics 206 further include a type of lane transport, such as single data rate (SDR) signaling, which transfers a single data bit per clock cycle; double data rate (DDR) signaling, which transfers two bits of data per clock cycle; and quad data rate (QDR) signaling, which transfers four bits of data per clock cycle. Additionally or alternatively, the chiplet link characteristics 206 include a transition cost that defines an energy cost of transitioning from the low voltage state to the high voltage state, and vice versa. In one or more implementations, the transition cost further takes into account an energy cost of crosstalk between adjacent lanes. Crosstalk refers a change in voltage or current of a lane due to the influence of signals from neighboring lanes. As such, both physical and electrical characteristics of the chiplet link are included in the chiplet link characteristics 206.

At 208, a power simulation is performed to generate baseline power measurements 210. The power simulation includes, for a plurality of different possible bit patterns of a flit of a given size, an expected power consumption of transporting the flit across the chiplet link 108. The power simulation uses the chiplet link characteristics 206 to model data transport across chiplet link 108, for instance. For example, the size of the flit is determined by a communication protocol specified for the particular chiplet link 108.

At 212, mask generation is performed. The mask generation includes determining which bits within the flit are to be targeted by a mask and defining a bit pattern of the mask. The mask, for instance, targets the entire flit or a portion of the flit. As a non-limiting example, a "1" in the mask indicates positions where the bit of the flit will be preserved, whereas a "0" indicates positions where the bit of the flit will be changed. The mask generation includes generating a plurality of masks for the plurality of different possible bit combinations of the flit.

At 214, a masked power simulation is performed to generate masked power measurements 216. By way of example, a given mask generated at 212 is applied to at least a portion of the flit having one of the plurality of different possible bit patterns, and transport of the masked data across the chiplet link 108 is modeled. The mask is applied to the flit in a bitwise operation, for instance. The process is performed iteratively and/or in parallel for various combinations of the generated masks and bit patterns of the flit.

At 218, a power comparison is performed by comparing the baseline power measurements 210 to the masked power measurements 216. By way of example, a given mask is determined to reduce power consumption of the chiplet link 108, e.g., by reducing chiplet link toggle rates and crosstalk energy costs, when the masked power measurement 216 is less than the corresponding baseline power measurement 210 by at least a threshold amount. The threshold amount is a programmable, non-zero power value, for example. In at least one variation, the threshold amount is a programmable percentage of the corresponding baseline power measurement 210. A mask that reduces power consumption, as determined by the power comparison, is stored in a mask set 220. A mask that does not reduce power consumption (e.g., when the baseline power measurement 210 is greater than the masked power measurement 216 or the masked power measurement 216 is not less than the baseline power measurement 210 the threshold amount) is discarded and/or adjusted through additional mask generation (e.g., at 212). As such, in at least one implementation, the mask generation is an iterative process.

In one or more implementations, the mask set 220 is reduced to a number that can be stored in the memory 112 as the pre-generated masks 114. By way of example, having individual masks for every bit pattern of a flit is not always practical due to device storage constraints and the number of bits in the flit. A flit having sixty-four bits, for instance, has over eighteen quintillion possible bit patterns, and thus, it is not practical to store an individual mask for each bit pattern. Therefore, in at least one implementation, multiple bit patterns map to the same mask. This reduces mask storage usage at the cost of a power increase compared with having individual masks for each possible combination of bits in the flit. Additionally or alternatively, a mask maps to a portion of the flit. As an illustrative non-limiting example, the mask includes eight bits and maps to an eight-bit portion of the larger flit.

Therefore, in at least one implementation, the masks selected from the mask set 220 for the pre-generated masks 114 include those resulting in power reduction to a largest number of flits, as determined by the power comparison at 218, until a pre-determined number of masks is reached and/or an allotted storage capacity for the pre-generated masks 114 is full. The pre-determined number of masks and/or allotted storage capacity is a tunable parameter that varies based on a capacity of a system in which the pre-generated masks 114 are implemented. For instance, a greater allotted storage capacity results in a greater number of masks being selected for the pre-generated masks 114, whereas a smaller allotted storage capacity results in fewer masks being selected for the pre-generated masks 114. As such, the number of masks included in the pre-generated masks 114 is chosen to balance power reduction benefits versus mask storage usage.

The pre-generated masks 114 are then used in the runtime process 204. During the runtime process 204, a data packet 222 to be transmitted across the chiplet link 108 is identified, and at 224, packing format mapping is performed. Packing format mapping includes data structuring that organizes the data packet 222 into a structure format that fits the communication standards and protocol of the chiplet link 108. For example, the data packet 222 is organized into one or more flits, which are a fixed-size unit of data, according to the communication protocol. This includes, for example, padding, truncating, and/or diving the data to form the one or more flits. In at least one implementation, header and/or control information that provides details about the data packet 222, such as source and destination addresses, packet sequence numbers, and so forth, are incorporated into the flit structure. Additionally or alternatively, the packing format mapping includes mapping the one or more flits to physical lanes of the chiplet link 108.

At 226, a toggle rate that would occur while transporting the data packet 222 according to the packing format mapping is measured. For instance, the toggle rate is determined based on a bit pattern in the one or more flits relative to a previously transmitted bit pattern. Toggling occurs when a given lane of the chiplet link 108 switches between transporting a "0" (e.g., the low voltage state) and transporting a "1" (e.g., the high voltage state), as discussed above.

At 228, masks are selected from the pre-generated masks 114 in order to reduce the toggle rate measured at 226, thus reducing the power consumption by the chiplet link 108. Selecting masks includes selecting one or more masks. For instance, a first mask is selected for a first portion of the one or more flits, a second mask is selected for a second portion of the one or more flits, and so forth. Alternatively, a single mask is selected for an entirety of the one or more flits. As another example, additionally or alternatively, no mask is selected for a portion of the one or more flits, such as when none of the pre-generated masks 114 reduce the toggle rate of that portion. In accordance with the techniques described herein, selecting the one or more masks includes identifying an index of the one or more masks.

At 230, the selected masks are applied to the one or more flits, e.g., in a bitwise operation to produce one or more toggle reduced, masked flits 232. The masked flits 232 are transported across the chiplet link 108, such as from the first chiplet 102 to the second chiplet 104 or from the second chiplet 104 to the first chiplet 102. Additionally, at 234, a mask index corresponding to a selected mask is sent to a receiver. For instance, the receiver is the second chiplet 104 when the masked flits 232 are transmitted from the first chiplet 102 to the second chiplet 104 via the chiplet link 108, and the receiver is the first chiplet 102 when the masked flits 232 are transmitted to the first chiplet 102 from the second chiplet 104 via the chiplet link 108.

It is to be appreciated that different components can perform at least parts of the non-limiting example process 200 shown in FIG. 2 without departing from the scope of the described techniques. By way of example, in at least one variation, the offline process 202 is performed by a computing system that is separate from the non-limiting example system 100 of FIG. 1, and the pre-generated masks 114 are loaded to the memory 112 after generation.

Figure 3:
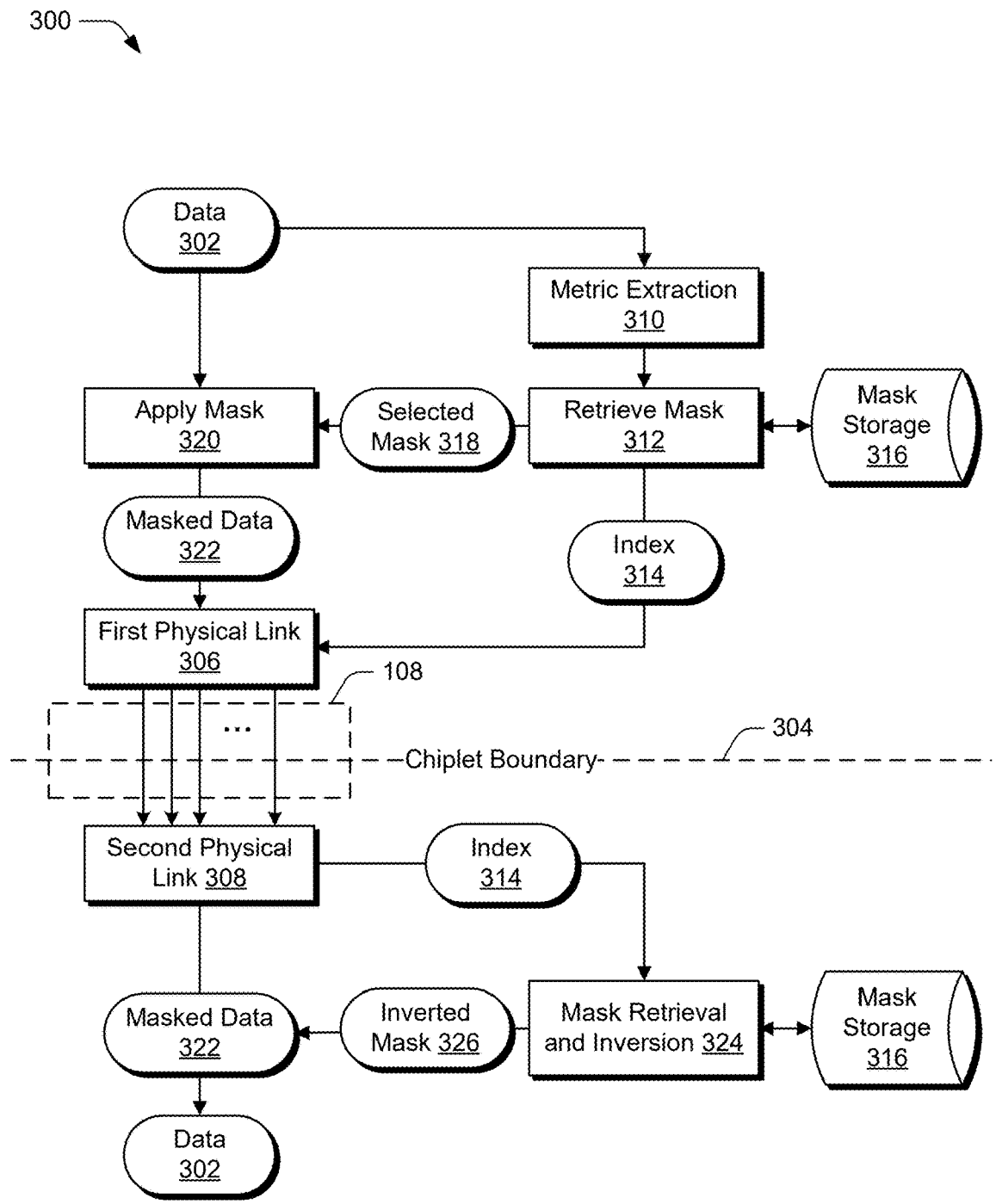
FIG. 3 depicts a non-limiting example process in which a mask is applied in order to reduce toggle rates and power consumption by a chiplet link.

FIG. 3 depicts a non-limiting example process 300 in which a mask is applied in order to reduce toggle rates and power consumption by a chiplet link. The example process 300 is similar to the runtime process 204 of FIG. 2, for instance. The illustrated example process 300 includes, or is implemented by, the first chiplet 102, the second chiplet 104, the chiplet link 108, the controller 110, and the memory 112 from FIG. 1.

The non-limiting example process 300 includes data 302 to be transmitted across a chiplet boundary 304 via the chiplet link 108, e.g., from the first chiplet 102 to the second chiplet 104 or from the second chiplet 104 to the first chiplet 102. The chiplet link 108 couples a first physical link 306 (e.g., of the first chiplet 102) on a first side of the chiplet boundary 304 and a second physical link 308 (e.g., of the second chiplet 104) on a second side of the chiplet boundary 304. As such, the first physical link 306 is a first endpoint of the data transfer, and the second physical link 308 is a second endpoint of the data transfer.

A metric extraction operation 310 is performed (e.g., by the first chiplet 102) on the data 302 to be transmitted. For example, toggle rates are determined from bits of flits of the data 302, and entropy calculations are used to find a best-match mask (or masks) of the pre-generated masks 114 depicted in FIG. 1 as a selected mask 318. The entropy calculations account for an energy cost associated with transitioning a lane between the two different voltage states (e.g., from the high voltage state to the low voltage state or vice versa) as well as an energy cost associated with cross talk between adjacent lanes. The best-match mask refers to a mask of the pre-generated masks 114 that is determined, based on the entropy calculations, to result in a lower (e.g., lowest) power consumption by the chiplet link 108 than the other pre-generated masks 114 for at least a portion of the data 302. For example, in at least one implementation, a first mask is selected to mask a first portion of the data 302, a second mask is selected to mask a second portion of the data 302, and so forth. As such, the pre-generated masks 114 are used alone or in combination. However, for simplicity, the non-limiting example process 300 will be described with respect to a single selected mask 318, although it is to be appreciated that the following discussion also applies to scenarios where multiple masks are selected and used in combination.

Once the selected mask 318 is identified, a retrieve mask operation 312 is performed, e.g., by the first chiplet 102. By way of example, the retrieve mask operation 312 includes identifying an index 314 of the selected mask 318 in order to retrieve the selected mask 318 from a mask storage 316, which is one example of, or is included in, the memory 112 of FIG. 1. The index 314, for instance, allows the selected mask 318 to be retrieved from a look-up table of the mask storage 316.

The selected mask 318 is applied to the data 302 (e.g., by the first chiplet 102) via an apply mask operation 320 to generate masked data 322. In at least one implementation, applying the selected mask 318 is a bitwise operation where the selected mask 318 is used to selectively modify or filter specific bits within the data, as mapped according to bits of the selected mask 318. For example, the selected mask 318, as well as other masks stored in the mask storage 316, includes a bit pattern of ones and zeros, and a given bit in the selected mask 318 corresponds to a position in the data 302. Applying the selected mask 318, for instance, modifies specific bits in the data 302 based on whether a "1" or a "0" is present at a particular position of the data and/or a corresponding position of the selected mask 318.

The masked data 322 is transmitted by the chiplet link 108, from the first physical link 306 to the second physical link 308. The index 314 of the selected mask 318 is also transmitted across the chiplet link 108. As mentioned above with respect to FIG. 1, in at least one implementation, the index 314 is transmitted via a sideband communication. However, in variations, the index 314 is transmitted via a main band communication. As such, the masked data 322 and the index 314 are received (e.g., by the second chiplet 104) across the chiplet boundary 304.

A mask retrieval and inversion operation 324 is performed. That is, based on the received index 314, the selected mask 318 is retrieved (e.g., by the second chiplet 104) from the mask storage 316 and inverted to generate an inverted mask 326. If a bit is "0" in the selected mask 318, it becomes "1" in the inverted mask 326. If a bit is "1" in the selected mask 318, it becomes "0" in the inverted mask 326. The inverted mask 326 is used (e.g., by the second chiplet 104) to correct the masked data 322 back to the data 302. For example, applying the inverted mask 326 to the masked data 322 reverses the bitwise operations performed while applying the selected mask 318 to the data 302, thus restoring the original sequence of ones and zeros in the data 302. In this way, the data 302 is transmitted across the chiplet boundary 304 with reduced power consumption and toggle rates of the chiplet link 108 and without bandwidth-consuming inversion signals or metadata. As a result, the chiplet link 108 has increased bandwidth for transmitting the data 302 itself.

Figure 4:
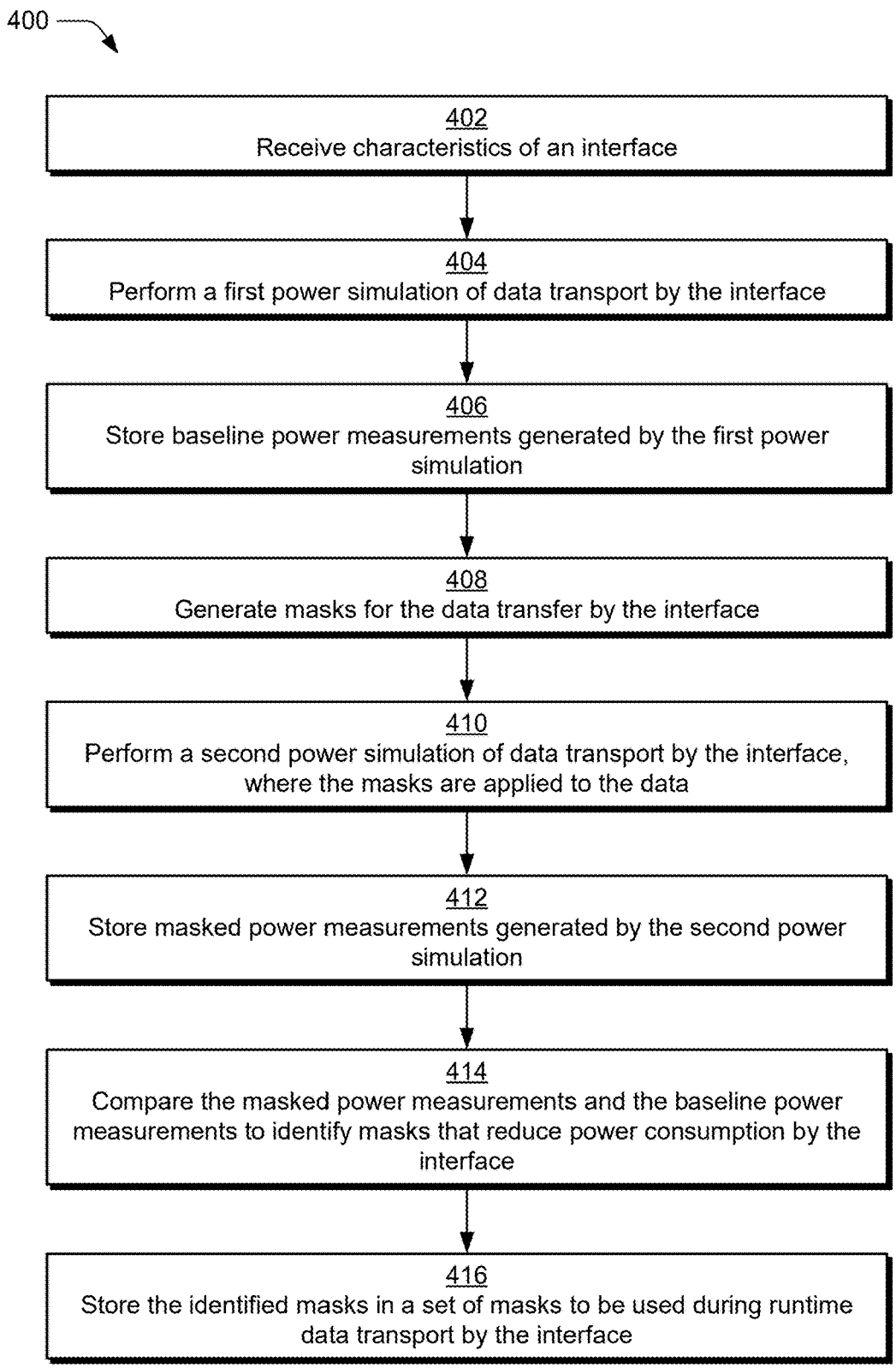
FIG. 4 is a flow diagram depicting an algorithm as a step-by-step procedure in an example implementation of generating flit masks for chiplet link toggle rate and power consumption reduction.

FIG. 4 is a flow diagram depicting an algorithm as a step-by-step procedure 400 in an example implementation of generating flit masks for chiplet link toggle rate and power consumption reduction. In one or more implementations, procedure 400 corresponds to the offline process 202 of FIG. 2.

Characteristics of an interface are received (block 402). By way of example, the interface is a chiplet link (e.g., the chiplet link 108), although the procedure 400 is adaptable to other types of interfaces, such as inter-chip communication interfaces, memory interfaces, and storage interfaces. In accordance with the principles discussed herein, the characteristics include physical and electric characteristics, such as a number of physical lanes, a type of lane transport, a transition cost that defines an energy cost of transitioning from a low voltage data signal to a high voltage data signal (and vice versa), and an energy cost of crosstalk between adjacent lanes, such as described above with respect to the chiplet link characteristics 206 of FIG. 2.

A first power simulation of data transport by the interface is performed (block 404). By way of example, the first power simulation includes, for a plurality of different bit patterns, an expected power consumption of transporting data across the interface. The first power simulation uses the received characteristics to model the data transport, for instance, of a plurality of different possible bit patterns of a data unit of a given size, such as a flit sized according to the chiplet link characteristics 206. In at least one variation, a smaller portion of data is used for the modeling, such as a portion of a data packet typically transferred via the interface, in order to reduce a number of permutations performed for the first power simulation.

Baseline power measurements generated by the first power simulation are stored (block 406). By way of example, a separate baseline power measurement is stored for individual bit patterns of the plurality of different bit patterns. The baseline power measurements are stored at least temporarily during execution of the procedure 400, such as in the memory 112 or another dedicated storage location.

Masks for the data transport by the interface are generated (block 408). In one or more implementations, the masks include a plurality of masks having different ordered combinations of ones and zeros. In one or more implementations, a "1" indicates a position where data will be unchanged through masking, whereas a "0" indicates a position where the data will be altered. As such, the different masks will differently alter a given bit pattern of data. In one or more implementations, a number of bits in individual masks is equal to a number of bits in the data used in the first power simulation. However, in at least one variation, the number of bits in the individual masks is less than the number of bits in the data used in the first power simulation. It is to be appreciated that in at least one implementation, the masks include a subset of the possible ordered combinations of ones and zeros.

A second power simulation of data transport by the interface is performed, where the masks are applied to the data (block 410). By way of example, the second power simulation includes modeling application of the masks to individual bit patterns of the plurality of different bit patterns and calculating the expected power consumption of transporting the masked data across the interface based on the characteristics of the interface. As such, the second power simulation is similar to the first power simulation except that the data is altered by the masks.

Masked power measurements generated by the second power simulation are stored (block 412). By way of example, separate masked power measurements are stored for different combinations of the masks and the individual bit patterns of the plurality of different bit patterns. For instance, a first masked power measurement corresponds to a first mask altering a first bit pattern of data, a second masked power measurement corresponds to the first mask altering a second bit pattern of data, a third masked power measurement corresponding to a second mask altering the first bit pattern of data, and so forth, in the various permutations. The masked power measurements are stored at least temporarily during execution of the procedure 400 in the memory 112 or another dedicated storage location.

The masked power measurements and the baseline power measurements are compared to identify masks that reduce power consumption by the interface (block 414). By way of example, the masked power measurement generated during the second power simulation, when a given bit pattern of data is masked with one of the masks, is compared to the corresponding baseline power measurement generated for the given bit pattern of data during the first power simulation, without the mask. In one or more implementations, the masked power measurement is considered to be less than the corresponding baseline power measurement when the masked power measurement is less than the corresponding baseline power measurement by at least a threshold amount. The threshold amount is a programmable, non-zero power value or percentage of the corresponding baseline power measurement. In general, the masked power measurement is less than the corresponding baseline power measurement when a given mask reduces a toggle rate of the interface and/or an effect of crosstalk between adjacent lanes of the interface compared to the transmitting the unmasked bit pattern. In contrast, the given mask is determined not to reduce power consumption when the masked power measurement is not less than the corresponding baseline power measurement by at least the threshold amount, such as when the masked power measurement is greater than the corresponding baseline power measurement.

The identified masks are stored in a set of masks to be used during runtime data transport by the interface (block 416). By way of example, the identified masks are stored as the pre-generated masks 114 in the memory 112. In contrast, masks that are not identified as reducing power consumption by the interface are not stored in the set of masks.

Figure 5:
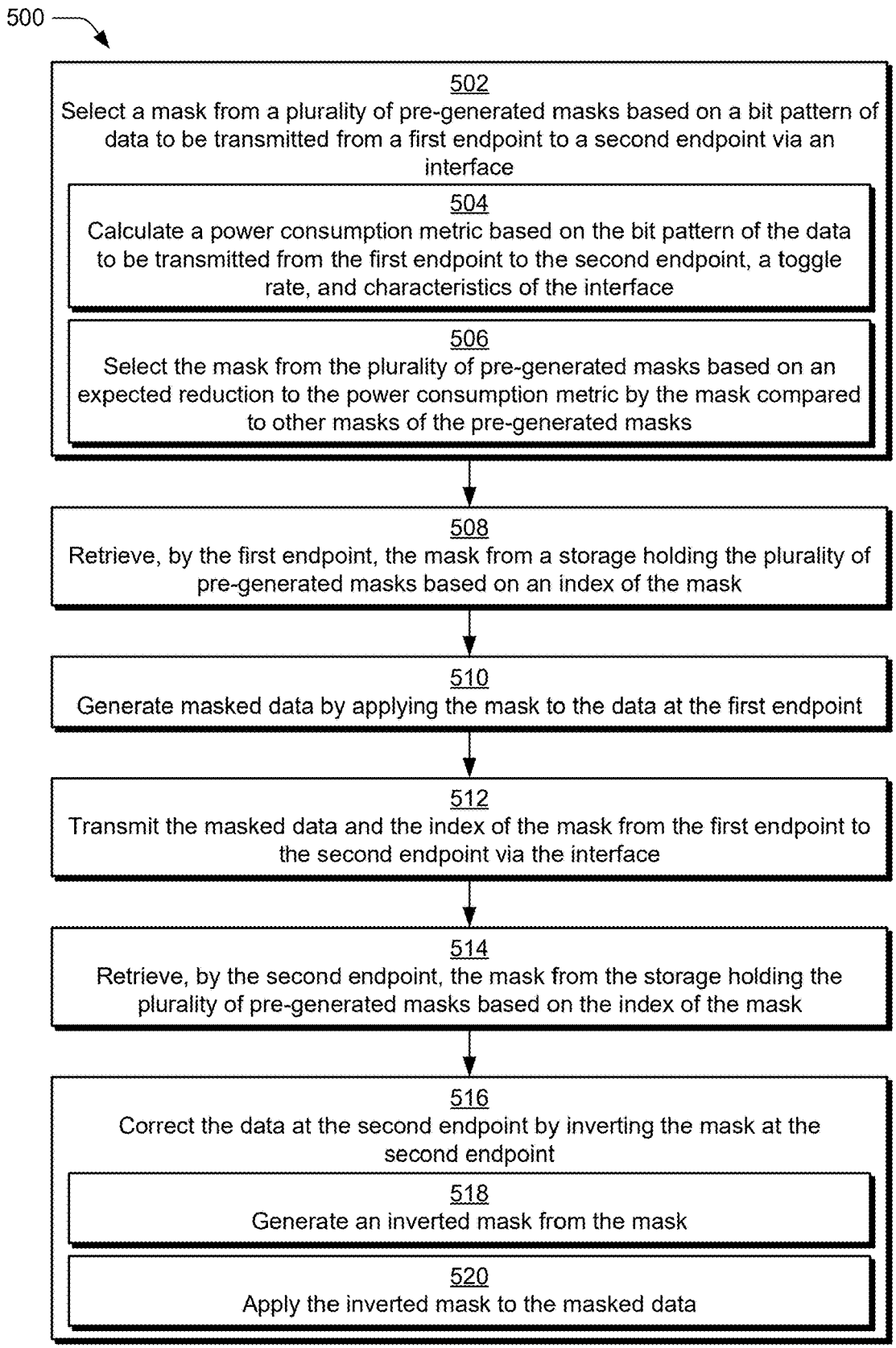
FIG. 5 is a flow diagram depicting an algorithm as a step-by-step procedure in an example implementation of toggle and power reduction for chiplet links.

FIG. 5 is a flow diagram depicting an algorithm as a step-by-step procedure 500 in an example implementation of toggle and power reduction for chiplet links. In one or more implementations, the step-by-step procedure 500 corresponds to the runtime process 204 of FIG. 2 and/or the non-limiting example process 300 of FIG. 3.

A mask is selected from a plurality of pre-generated masks based on a bit pattern of data to be transmitted from a first endpoint to a second endpoint via an interface (block 502). By way of example, the first endpoint is the first chiplet 102, the second endpoint is the second chiplet 104, and the interface is the chiplet link 108, which physically and communicatively couples the first chiplet 102 and the second chiplet 104. In one or more implementations, the data is organized at the first endpoint into more or more flits, which are a fixed-size unit of data specified by a communication protocol of the interface, during a packing format mapping process, such as elaborated above with respect to FIG. 2.

In accordance with the principles discussed herein, to select the mask, a power consumption metric is calculated based on the bit pattern of the data to be transmitted from the first endpoint to the second endpoint, a toggle rate, and characteristics of the interface (block 504). By way of example, the first endpoint, or a controller coupled thereto (e.g., the controller 110) calculates the toggle rate based on a bit pattern in the one or more flits relative to a previously transmitted bit pattern. Toggling occurs when a given lane of the chiplet link 108 switches between transporting a "0" (e.g., a low voltage state signal) and transporting a "1" (e.g., a high voltage state signal). An energy cost of crosstalk is also considered. For instance, when multiple lanes are closely spaced or routed in proximity to each other, interference, a change in the voltage or current of a lane can occur due to the influence of signals on neighboring lanes. Therefore, in some scenarios, it is more energetically favorable to transition a lane to be at the same voltage state as the adjacent lanes even though the transition itself has an energy cost.

In accordance with the principles discussed herein, the mask is selected from the plurality of pre-generated masks based on an expected reduction to the power consumption metric by the mask compared to other masks of the pre-generated masks (block 506). By way of example, the first endpoint performs entropy calculations to identify which mask, when applied to the data, will result in the greatest reduction to the power consumption metric. The reduction to the power consumption is modeled based on a reduced toggle rate of the masked data versus unmasked data and a reduced impact of crosstalk, for instance.

The mask is retrieved, by the first endpoint, from a storage holding the plurality of pre-generated masks based on an index of the mask (block 508). By way of example, responsive to selecting the mask, the first endpoint identifies the index of the mask and uses the index to retrieve the mask from the storage (e.g., the memory 112 of FIG. 1 and/or the mask storage 316 of FIG. 3). In one or more implementations, the plurality of pre-generated masks is stored in a look-up table, and so identifying the index enables the selected mask to be retrieved from the look-up table.

Masked data are generated by applying the mask to the data at the first endpoint (block 510). By way of example, the first endpoint applies the first mask using a bitwise operation, where the mask selectively modifies or filters specific bits within the data according to corresponding bits of the mask. For instance, the mask includes a bit pattern of ones and zeros, and each bit in the mask corresponds to a bit position of the data. Applying the mask modifies specific bits in the data based on whether a "1" or a "0" is present at a particular position of the data and/or a corresponding position of the selected mask.

As discussed herein, the mask corresponds to at least a portion of the data. For instance, in some scenarios, the mask has fewer bits than the data. As such, it is to be appreciated that in at least one implementation, a portion of the data remains unmasked in the masked data. Additionally or alternatively, multiple masks are selected and used in combination to generate the masked data. For example, a first mask is selected for and applied to a first portion of the data, a second mask is selected for and applied to a second portion of the data, and so forth.

The masked data and the index of the mask are transmitted from the first endpoint to the second endpoint via the interface (block 512). By way of example, the masked data are transmitted via a main band communication of the interface, whereas the index of the mask (or masks, when multiple masks are used in combination) is transmitted via either the main band communication or a side band communication of the interface. Transporting the index of the mask rather than the mask data itself or an inversion signal advantageously reduces a bandwidth of the data transfer, thus increasing a bandwidth of the main band and enabling more efficient data transfer. When the index is communicated via the sideband, the bandwidth of the main band is further increased.

The mask is retrieved, by the second endpoint, from the storage holding the plurality of pre-generated masks based on the index of the mask (block 514). By way of example, in response to receiving the index, the second endpoint uses the index to retrieve the mask from the plurality of pre-generated masks. Because the second endpoint has access to the same storage as the first endpoint, communicating the mask index rather than the mask itself enables the second endpoint to efficiently retrieve the mask with reduced data transport between the first endpoint and the second endpoint.

The data are corrected at the second endpoint by inverting the mask at the second endpoint (block 516). In accordance with the techniques described herein, to correct the data, an inverted mask is generated from the mask (block 518), and the inverted mask is applied to the masked data (block 520). By way of example, the second endpoint generates the inverted mask by inverting each bit location of the mask. Accordingly, a "0" in the mask becomes a "1" in the inverted mask, and a "1" in the mask becomes a "0" in the inverted mask. The inverted mask is applied to the masked data in a bitwise operation, which reverses the bitwise operations performed while applying the mask. As such, applying the inverted mask restores the bit pattern of the data.

It is to be appreciated that the techniques described herein are applicable to a plurality of different types of interfaces, such as external socket interfaces, in addition to chiplet links. For instance, in at least one variation, a specialized DRAM stores a similar set of pre-generated toggle masks, and DRAM commands are used to transmit a toggle mask index for each transaction.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the first chiplet 102, the second chiplet 104, the chiplet link 108, the controller 110, and the memory 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit, and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for a computing environment, comprising:
a chiplet link communicatively coupling a first chiplet and a second chiplet; and a controller configured to:
  select a mask from a plurality of pre-generated masks based on a bit pattern of data to be transmitted from the first chiplet to the second chiplet via the chiplet link;
  generate masked data by applying the mask to the data at the first chiplet;
  transmit the masked data from the first chiplet to the second chiplet via the chiplet link; and
  correct the masked data at the second chiplet by inverting the mask at the second chiplet.

2. The system of claim 1, wherein selecting the mask from the plurality of pre-generated masks based on the bit pattern of the data to be transmitted from the first chiplet to the second chiplet via the chiplet link comprises:
  calculating a power consumption metric based on the bit pattern of the data to be transmitted from the first chiplet to the second chiplet and characteristics of the chiplet link; and
  selecting the mask from the plurality of pre-generated masks based on an expected reduction to the power consumption metric by the mask compared to other masks of the plurality of pre-generated masks.

3. The system of claim 2, wherein the power consumption metric includes an energy cost of transitioning lanes of the chiplet link between a high voltage state and a low voltage state during transmission of the data.

4. The system of claim 2, wherein the power consumption metric includes an energy cost of crosstalk between adjacent lanes of the chiplet link.

5. The system of claim 1, wherein generating the masked data by applying the mask to the data at the first chiplet comprises:
  identifying, by the first chiplet, an index of the mask responsive to selecting the mask from the plurality of pre-generated masks;
  retrieving, by the first chiplet, the mask from a storage holding the plurality of pre-generated masks based on the index of the mask; and
  applying, by the first chiplet, the mask to the data via a bitwise operation.

6. The system of claim 5, wherein correcting the masked data at the second chiplet by inverting the mask at the second chiplet comprises:
  receiving, by the second chiplet, the index of the mask;
  retrieving, by the second chiplet, the mask from the storage based on the index of the mask;
  generating, by the second chiplet, an inverted mask from the mask; and
  applying, by the second chiplet, the inverted mask to the masked data.

7. The system of claim 6, wherein the second chiplet receives the index of the mask from the first chiplet via a main band of the chiplet link.

8. The system of claim 6, wherein the second chiplet receives the index of the mask from the first chiplet via a sideband of the chiplet link.

9. The system of claim 1, wherein the plurality of pre-generated masks is generated via a power simulation that compares baseline power measurements of unmasked bit patterns to masked power measurements of masked bit patterns.

10. A method, comprising:
  selecting a mask from a plurality of pre-generated masks based on a bit pattern of data to be transmitted from a first endpoint to a second endpoint via an interface;
  generating masked data by applying the mask to the data at the first endpoint;
  transmitting the masked data from the first endpoint to the second endpoint via the interface; and
  correcting the data at the second endpoint by inverting the mask at the second endpoint.

11. The method of claim 10, wherein selecting the mask from the plurality of pre-generated masks based on the bit pattern of the data to be transmitted from the first endpoint to the second endpoint via the interface comprises:
  calculating a power consumption metric based on an energy cost of transitioning lanes of the interface between a high voltage state and a low voltage state during transmission of the data, as determined based on a toggle rate of the interface for the transmission of the data; and
  selecting the mask from the plurality of pre-generated masks based on an expected reduction to the power consumption metric by applying the mask to the data.

12. The method of claim 10, wherein generating the masked data by applying the mask to the data at the first endpoint comprises:
  identifying, by the first endpoint, an index of the mask responsive to selecting the mask from the plurality of pre-generated masks;
  retrieving, by the first endpoint, the mask from a storage holding the plurality of pre-generated masks based on the index of the mask; and
  applying the retrieved mask to the data using a bitwise operation.

13. The method of claim 12, further comprising transmitting the index of the mask to the second endpoint via the interface, and wherein correcting the data at the second endpoint by inverting the mask at the second endpoint comprises:
  retrieving, by the second endpoint, the mask from the storage based on the index of the mask received from the first endpoint via the interface;
  generating, by the second endpoint, an inverted mask based on the retrieved mask; and
  applying, by the second endpoint, the inverted mask to the masked data.

14. The method of claim 10, wherein the plurality of pre-generated masks is generated during an offline operation via a power simulation that compares baseline power measurements of unmasked bit patterns to masked power measurements of masked bit patterns.

15. The method of claim 10, wherein the first endpoint is a first chiplet, the second endpoint is a second chiplet, and the interface is a chiplet link.

16. A system, comprising:
  a first endpoint;
  a second endpoint;
  an interface communicatively coupling the first endpoint and the second endpoint; and
  a controller configured to:
    extract, by the first endpoint, a metric for a data transmission from the first endpoint to the second endpoint via the interface based on a bit pattern of data to be transported and characteristics of the interface;
    select, by the first endpoint, at least one mask from a plurality of pre-generated masks based on the extracted metric;
    generate, by the first endpoint, masked data by applying the at least one mask to the data at the first endpoint;

transmit, by the interface, the masked data and an index of the at least one mask from the first endpoint to the second endpoint; and invert, by the second endpoint, the at least one mask.

17. The system of claim 16, wherein the metric comprises at least one of a toggle rate of lanes the interface for the data transmission or an energy cost of the data transmission.

18. The system of claim 16, wherein selecting, by the first endpoint, the at least one mask from the plurality of pre-generated masks based on the extracted metric comprises identifying which of the plurality of pre-generated masks is expected to reduce the extracted metric by a largest amount via an entropy calculation.

19. The system of claim 16, wherein transmitting, by the interface, the masked data and the index of the at least one mask from the first endpoint to the second endpoint comprises:

transmitting the masked data via a main band of the interface; and transmitting the index of the at least one mask via the main band of the interface or a sideband of the interface.

20. The system of claim 16, wherein the first endpoint is a first chiplet, the second endpoint is a second chiplet, and the interface is a chiplet link.

\* \* \* \* \*